United States Patent [19]
Pitts, Jr.

[11] Patent Number: 5,817,224
[45] Date of Patent: Oct. 6, 1998

[54] ELECTROSTATIC DEVICE AND METHOD FOR ENHANCING CHEMICAL AGGREGATION OF PARTICLES IN WATER SUSPENSION

[76] Inventor: M. Michael Pitts, Jr., 4565 S. Palo Verde Rd., #213, Tucson, Ariz. 85714

[21] Appl. No.: 779,819

[22] Filed: Jan. 6, 1997

Related U.S. Application Data

[63] Continuation-in-part of Ser. No. 197,154, Feb. 16, 1994, Pat. No. 5,591,317.

[51] Int. Cl.$^6$ ........................................................ B03C 5/00
[52] U.S. Cl. .......................................... 204/571; 204/667
[58] Field of Search ................................... 204/571, 573, 204/667, 670, 671; 210/243, 748

[56] References Cited

U.S. PATENT DOCUMENTS

| | | | |
|---|---|---|---|
| 3,580,836 | 5/1971 | King ........................................ | 204/308 |
| 3,933,606 | 1/1976 | Harms .................................... | 204/152 |
| 3,972,800 | 8/1976 | King ........................................ | 204/302 |
| 4,024,047 | 5/1977 | Clark et al. ............................. | 204/302 |
| 4,199,430 | 4/1980 | McMahon ............................... | 204/302 |
| 4,238,326 | 12/1980 | Wolf ........................................ | 210/695 |
| 4,290,898 | 9/1981 | von Hagel et al. ..................... | 210/738 |
| 4,295,973 | 10/1981 | Jain ........................................ | 210/738 |
| 4,755,305 | 7/1988 | Fremont et al. ........................ | 210/748 |
| 4,802,991 | 2/1989 | Miller ..................................... | 210/705 |
| 4,915,846 | 4/1990 | Thomas, Jr. et al. ................... | 210/702 |

OTHER PUBLICATIONS

Pitts, M. Michael, Jr., "Fouling Mitigation in Aqueous Systems . . . ," Presented in Shell Beach California on Jun. 18–23, 1995.

Shamlou, P.A., ed., Processing of Solid–Liquid Suspensions, Oxford, Butterworth–Heineman Ltd. (1993), month of application not available, pp. 18–58.

Primary Examiner—Kathryn L. Gorgos
Assistant Examiner—William T. Leader
Attorney, Agent, or Firm—Antonio R. Durando

[57] ABSTRACT

A method for enhancing the efficiency of a solid-liquid separation process by exposure to an electrostatic-field generator utilizes a vitrified ceramic tube of unibody construction having a single open end adapted to receive a high-voltage power cable through an insulated cap. The interior surface of the ceramic tube is lined with a layer of conductive material electrically connected to the power cable, thereby providing a relatively-large conductive surface in intimate contact with the dielectric surface of the ceramic tube. The device is used in connection with conventional chemical additives for separating suspended solids from water to reduce chemical consumption and improve operating efficiency. The device is immersed in the water carrying suspended particles upstream of the treatment with chemical agents and is energized with a high DC voltage, thereby creating an electrostatic field across the dielectric of the tube's ceramic and across the body of water. The charge on the surface of particles to be separated by physical aggregation is altered by the electrostatic field so generated and is manipulated so as to produce enhanced performance by the chemicals used in the conventional process downstream.

17 Claims, 5 Drawing Sheets

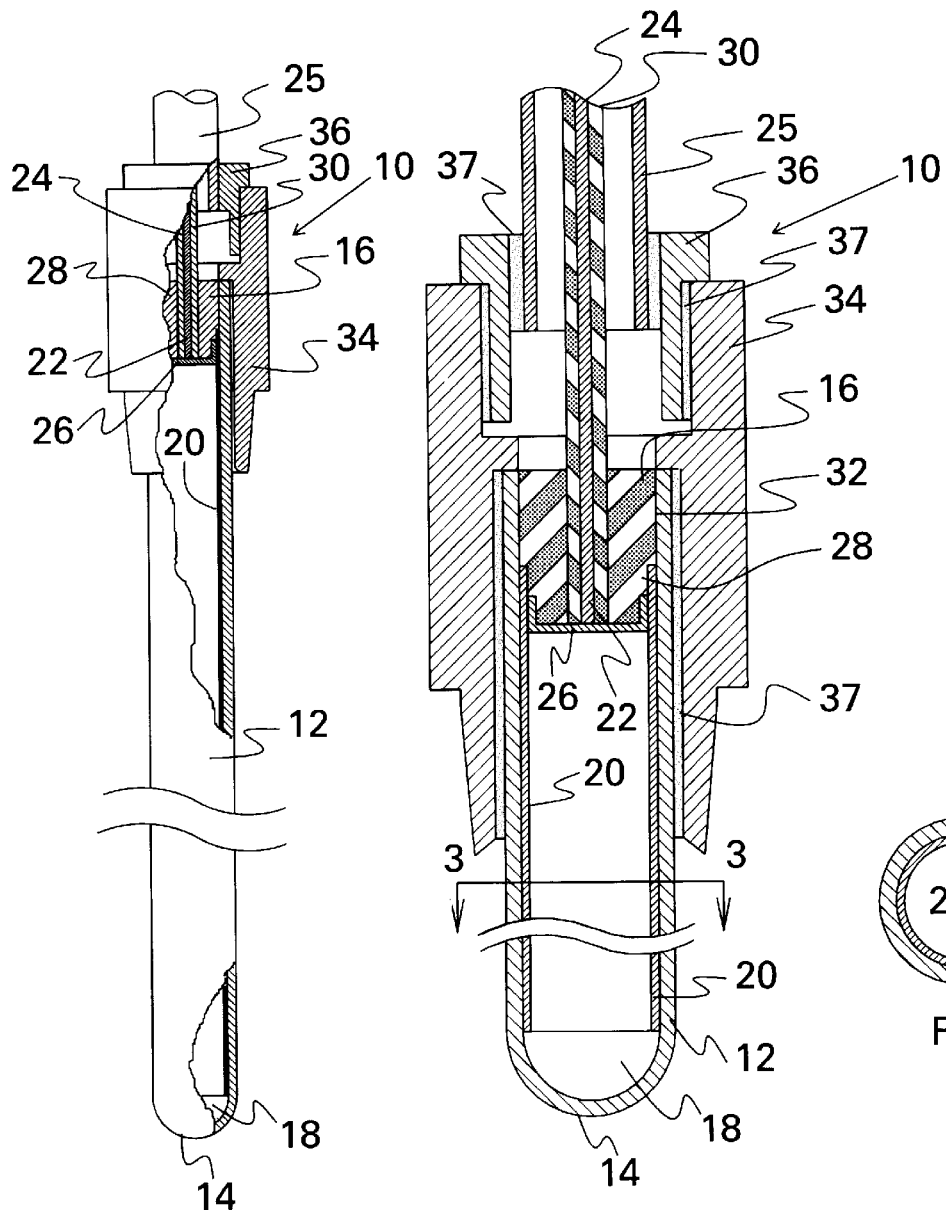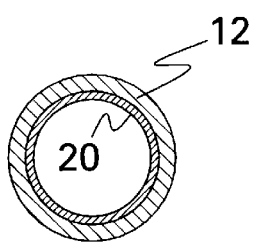
Fig. 1  Fig. 2  Fig. 3

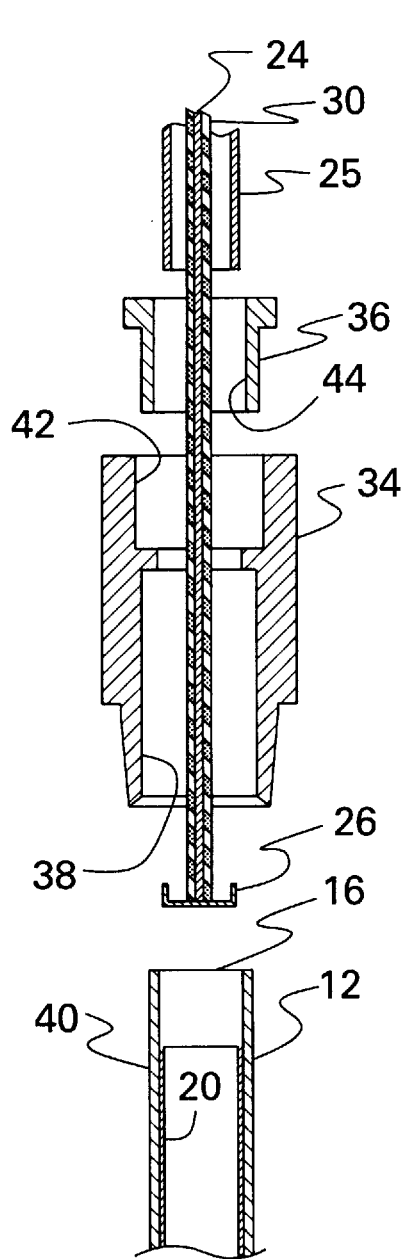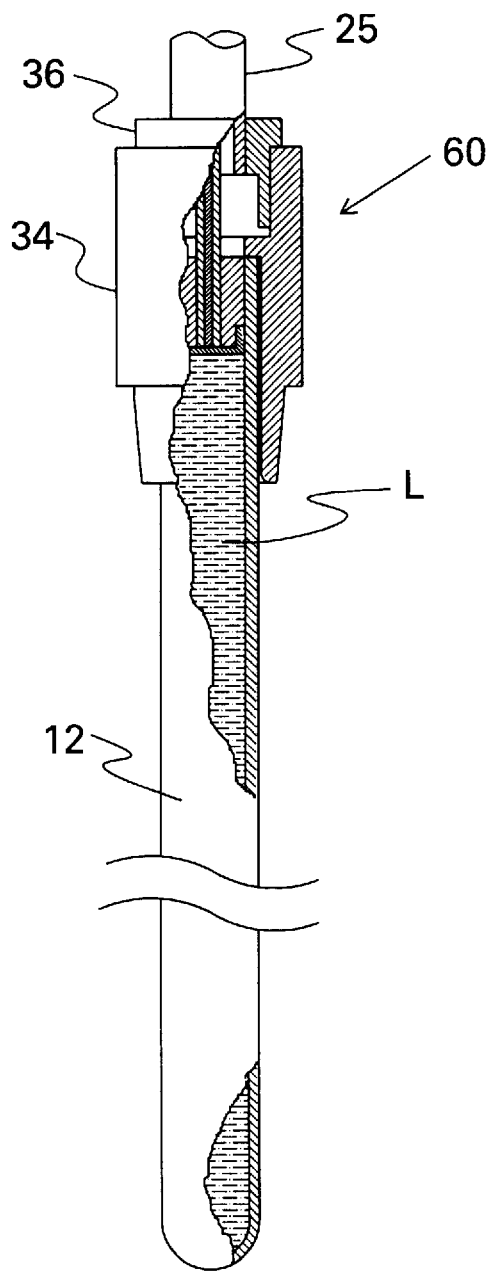
Fig. 4
Fig. 9 ature, the invention describes a process and a device for
ELECTROSTATIC DEVICE AND METHOD FOR ENHANCING CHEMICAL AGGREGATION OF PARTICLES IN WATER SUSPENSION

RELATED APPLICATIONS

This is a continuation-in-part application of U.S. Ser. No. 08/197,154, filed by the same inventor on Feb. 16, 1994, issued as U.S. Pat. No. 5,591,317.

BACKGROUND OF THE INVENTION

1. Field of the Invention

This invention is generally related to methods and apparatus for the electrostatic treatment of water streams. In particular, the invention describes a process and a device for improving the efficiency of conventional operations for solid-liquid separation.

2. Description of the Related Art

All water systems are commonly subject to reduced efficiency and failure as a result of scaling and clogging by solid particles suspended in the aqueous medium. As a means for reducing these problems, the concept of treating the water by inducing an electrostatic field across it has been known for many years and many devices have been utilized with varying success, both for industrial and domestic applications.

Solids accumulation is a particularly severe problem in solvent extraction circuits, such as in mining operations and other large-scale industrial applications, wherein suspended solids bind to form masses of sludge that decrease the efficiency and inhibit the operation of the equipment. It has been found that the degree of accumulation depends on the particulate content of the water, the operating conditions of the circuit, and the type of process involved (such as, for example, a particular leaching technique). The sludge consists principally of silicate mineral matter bound by organic components dispersed in water. Most solids enter the system in suspension and some precipitate while passing through, causing scaling and accumulation of sludge. Regardless of the particular nature of the water circuit, the presence of accumulated sludge invariably results in increased operating expenses and additional capital costs associated with control efforts.

For some time researchers have known that the surface charge of particles in suspension can be altered by exposure to high-potential electrostatic fields. A particulate dispersion is improved as a result of elevated levels of induced like charges on the surface of sub-micron particles that yield mutual repulsion of the particles. Similarly, the particles may become attracted by exposure to various levels of charge intensity that yields reduced repulsion among them. This phenomenon forms the basis for well known applications, such as in electrostatic precipitators, photocopiers, and certain paint spraying techniques.

In all devices found in the prior art, the water to be treated is subjected to an electrostatic field created by insulated electrodes arranged to produce a series of capacitive layers between them. Given the very high voltages applied to the electrodes (in the order of about 10,000 DC volts), the integrity and strength of the insulation between the water and at least one of the electrodes is crucial for the continued operation of a system. Any breakdown of the dielectric layer causes a short through the water body and the inevitable shutdown of the system. Therefore, all known devices are constructed such as to ensure the integrity of the dielectric material used to insulate the electrode (which is usually positive for scale-reduction applications). This is achieved in all cases by enveloping a tubular metallic electrode in a Teflon® sleeve that is heat shrunk around the outer surface of the electrode and by sealing each end of the resulting insulated electrode with protective dielectric bushings. Thus, this process provides a seamless insulating layer of Teflon® around the metallic electrode and ensures intimate contact between the two materials. Such intimate contact is very important because any air space left between the metal and the dielectric, such as by blisters or bubbles in the dielectric layer, causes electrical arcing between the two that eventually perforates the Teflon® layer, shorts the electrode to the water body, and greatly reduces the electrostatic efficiency of the device. Moreover, a large air space would form yet another dielectric layer within the system, which is undesirable because of the very low capacitance of air that would greatly reduce the overall capacitance of the system.

In all cases, the objective of an electrostatic device is to apply the maximum electrostatic field across the fluid being treated. This goal is based on the assumption that the surface charges of organic and inorganic particles in the water are the responsible mechanisms promoting agglomeration and aggregation of sludge mass. It follows that anything done to alter the charge differentials that promote bonding of suspended particles with organic compounds serves to establish a more stable dispersion of solids. Since, for a given type of apparatus, the electrostatic field across the water medium is proportional to the potential applied to the system, it is desirable to apply as high a voltage as possible within the tolerances of the apparatus. Higher voltages have been found to be more effective, at times essential, for treating waters with high dissolved or suspended solid concentrations (such as with more than 1,000 ppm total dissolved solids) which have been shown to be totally unaffected by the apparatus of the prior art. The inefficiency of these devices is explained by the fact that the effective dielectric constant of water increases with increased content of dissolved solids. The result is a reduction of the voltage gradient in the water that can drop below the critical level necessary for producing a successful colloidal dispersion, which is the mechanism for scale or sludge deposit reduction. For a given water quality and flow rate, there is a critical field intensity below which no electrostatic effect is noted.

The devices of the prior art are limited in their application by twofold problems. Because of its well-known physical properties, PTFE material such as Teflon® is not suitable for adherence to the surface of metal conductors other than by the heat-shrink process described in the referenced patents. Any attempt to cover an electrode with Teflon® by a process other than heat-shrinking (such as would be required for an electrode having a non-cylindrical shape) would necessarily compel the formation of seams and connections that would be very hard to achieve and prone to breakdown during use. In addition, because of the material's non-stick properties, it would be very difficult to avoid the formation of air spaces between the metal and the dielectric surfaces. Accordingly, the preferred structure of such electrostatic devices is cylindrical, as described above, wherein each end of the insulated tube is sealed by means of separate dielectric bushings. Under normal stresses of operation, the connection between the tube and these end bushings has been the source of leaks that allow the water medium to come into contact with the high-voltage metallic tube and cause a complete system breakdown. U.S. Pat. No. 4,024,047 (Clark et al.) and U.S. Pat. No. 4,199,430 (McMahon) have provided some solutions toward improving the water-tight connection between the electrostatic tubes and the end caps, but still require the use of separate end components.

Another problem is related to the thickness of the dielectric material utilized in the prior art. In order to optimize its capacitance, the later of Teflon® used to coat the positive electrode is kept to a minimum. This causes the dielectric layer to be more vulnerable to imperfections of construction that might cause arcing or other operating stresses that could result in interruption of insulation. As a result of these constraints, the devices of the prior art are not suitable for efficient and dependable operation at voltages higher than approximately 10,000 volts, beyond which they quickly experience breakdowns. This characteristic prevents their utilization for large water-treatment systems and for waters containing high concentrations of dissolved solids, both of which require very high electrostatic potentials applied across the water body in order to process high-volume throughputs.

Because of these practical problems, the concept of applying an electrostatic field to a water suspension to effect its physical characteristics has been exploited only in relatively small water treatment systems (i.e, low throughput and/or low solid content). In my copending Application Ser. No. 08/197,154, I disclosed a new electrostatic device that is operable at very high voltages with reliability and safety. In particular, the disclosed electrostatic device is not susceptible to total breakdown as a result of breakage or interruptions in the dielectric integrity of the material.

Given the relatively high voltage at which my electrostatic device can be safely and reliably operated, I have explored its use for improving other processes, particularly solid separation processes, which are a necessary step in the preparation of surface water for public or industrial use and in the treatment of waste waters prior to discharge into waterways or subsequent industrial use. In many of such water treatment processes and in solid dewatering processes, the chemical composition of the water is modified to achieve a substantially complete separation of the suspended solids from the water. After chemical treatment, the sediment or sludge obtained from gravity settling is processed for more complete removal of water by various techniques such as filtration, pressing, or centrifugation.

Thus, these procedures for solid-liquid separation require the introduction of chemical additives to the particles in suspension to cause or enhance flocculation, coagulation or inter-particle bonding. The chemical agents draw or collect individual particles or groups of aggregated particles into heavier or tighter groups or aggregates in order to promote settling of solids from the suspension or to enhance the loss of water from interstitial spaces to produce a more dense sludge. The action of these chemical additives falls generally into three classes. The first is flocculation of colloids by van der Waals attraction achieved by increasing the electrolyte content of the water, especially the content of multi-valent ions. The chemicals commonly used for this purpose are the salts of calcium, aluminum, and iron. This application is often successful with low levels of chemical addition, lower than required to produce precipitates.

The second mechanism involves the addition of the same salts of multivalent ions in sufficient quantities to form gelatinous precipitates that have the ability to adsorb colloids or coalesce and entrap colloids (coagulation), thereby producing settleable aggregates from an otherwise stable dispersion. The third mechanism involves the addition of higher molecular-weight chemicals (naturally occurring vegetable gums, such as guar gum, as well as high molecular weight synthetic polymers or copolymers) that exhibit specific levels of charge density as a result of their chemical composition and molecular structure. These charge densities are used to influence the distribution of positive or negative ionic sites on the long or highly branched molecules of the chemicals. The chemical additives function by direct adsorption o:E suspended colloids or by adherence to their surface and formation of bridges between adjacent colloid aggregates. Very large and dense masses are thus produced that settle more rapidly or allow interstitial water to drain more freely from the aggregated solids than in the absence of chemical additives. Thus, the term aggregation, as used in this disclosure, is intended to refer to any process of particle agglomeration resulting from flocculation, coagulation or other form of inter-particle-bonding.

Suspended inorganic compounds may be amorphous or differ widely in crystal structure. Similarly, organic particles may be synthetic or biological in origin and may be degraded by oxidation or hydrolyzed to various degrees, thus influencing the nature of the charge sign and distribution. Therefore, the charge sign and charge density of suspended particles may be influenced by many factors. In addition, the water in which the solids are suspended may also contain a variety of impurities in addition to chemicals that influence pH, acidity, alkalinity and electrolyte concentration and composition.

Thus, the task of accomplishing efficient separation of suspended solids from liquids is influenced and complicated by many factors. Persons skilled in the art of producing these separations are accustomed to screening many types of chemical additives or combinations of chemicals and levels of addition to approximate complete and efficient separation of solids from liquid suspensions. Manufacturers of proprietary chemicals for this purpose seek to produce molecules that are compatible with the ionic nature of the colloids or suspended particles to enhance flocculation or coagulation and settling, often trying to account for the influence of chemical impurities in the water, the water temperature and even the design of the equipment across which the separation is being practiced.

This disclosure is directed at improving conventional aggregation processes by combining the use of chemicals with the application of electrostatic fields produced by the high voltages permitted by the device disclosed in my copending application. In U.S. Pat. No. 3,933,606, an electric field is utilized to cause the formation of a micro-floc that grows by a chaining process into a larger floc that adsorbs suspended matter in contaminated water. The floc is then separated to clarify the suspension and produce substantially purified water. Similarly, other inventors (see U.S. Pat. Nos. 4,238,326, 4,755,305, 4,802,991, and 4,915,846) have utilized an electric power source to cause at least partial flocculation or coagulation of suspended particles to improve water purification and dewatering processes. In spite of these disclosures of electric-field effectiveness for improving separation of impurities from water suspensions, though, the concept has not been exploited in combination with chemical treatment in conventional processes.

SUMMARY OF THE INVENTION

One objective of this invention is an electrostatic device for use in large-scale water treatment systems that require the application of very high DC voltages for efficiency of operation.

Another goal of the invention is a device that utilizes a dielectric material capable of withstanding the very high voltages required for large-scale water systems and, at the same time, efficiently transferring the electrostatic field intensity across the water body.

Yet another goal of the invention is a device that is not susceptible to shutdowns as a result of imperfections of construction that cause arcing between the conductive and dielectric layers thereof.

Another objective is a device that minimizes the use of insulating bushings to prevent contact between the conductive metallic layer of the device and the water medium surrounding it.

Still another objective is a device comprising a dielectric layer that is abrasion and corrosion resistant for durability and dependability during use in an industrial environment.

Another goal of the invention is the utilization of such a device in a process for improving conventional chemical processes for separating suspended solids from water by increasing the effectiveness and correspondingly reducing the consumption of chemical agents.

Therefore, according to these and other objectives, the present invention consists of a vitrified ceramic tube of unibody construction having a single open end adapted to receive a high-voltage power cable through an insulated cap. The interior surface of the ceramic tube is lined with a layer of conductive material electrically connected to the power cable, thereby providing a relatively-large conductive surface in intimate contact with the dielectric surface of the ceramic tube. The device is used in connection with conventional processes for separating suspended solids from water to reduce chemical consumption and improve operating efficiency. The device is immersed in the water carrying suspended particles upstream of the treatment with chemical agents and is energized with a high DC voltage, thereby creating an electrostatic field across the dielectric of the tube's ceramic and across the body of water. The charge on the surface of particles to be separated by physical aggregation is altered by the electrostatic field so generated and is manipulated so as to produce enhanced performance by the chemicals used in the conventional process downstream.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose only some of the various ways in which the invention may be practiced.

BRIEF DESCRIPTION OF THE DRAWINGS

FIG. 1 is an elevational partially cut-out view of an electrostatic device according to the present invention.

FIG. 2 is a more detailed, elevational cross-sectional view of the device of FIG. 1.

FIG. 3 is a top cross-sectional view of the same device as seen from line 3—3 in FIG. 2.

FIG. 4 is an exploded view of the open-end portion of the device shown in FIG. 3.

FIG. 9 is a schematic view of an alternative embodiment of the device of the invention wherein the metallic conductive layer is replaced with a conductive liquid solution.

DESCRIPTION OF THE PREFERRED EMBODIMENT

Figures 5, 6:
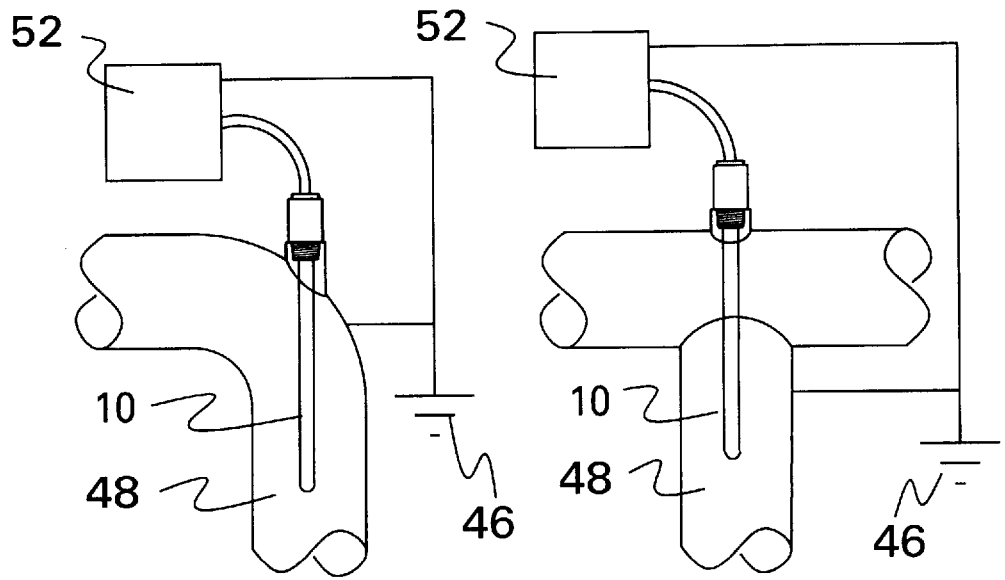
FIG. 5 is a schematic view of the device of the invention in use in a pipe-elbow arrangement of a large scale water-treatment system.
FIG. 6 is a schematic view of the device of the invention in use in a pipe-tee arrangement of a large scale water-treatment system.

As described in my copending application, one of the most important features of my invention is the realization that vitrified ceramic materials (porcelains) provide a basis for addressing many of the problems heretofore unsolved for high-voltage applications. Instead of utilizing an insulated inner metal tube as the supporting structure of an electrostatic device, wherein the dielectric layer consists of thin and relatively weak material around the tube, the electrostatic-field generator of the invention uses an outer tube made of vitrified ceramic material, which is much stronger than Teflon®, as both the insulating and bearing structure of the device. Because of its method of manufacture, a vitrified ceramic tube may be formed in unibody construction with a sealed end, thereby eliminating the need for a sealed, dielectric cap at that end.

Although ceramic materials have been recognized for decades as superior dielectrics, manufacturing techniques for forming seamless vitrified ceramic tubing of high-voltage capacitor quality have been developed only recently. Therefore, until the last decade there has been no economical substitute to Teflon® or other non-bearing materials (such as plastics) for building electrostatic-field generators. Thus, all commercial production of electrostatic-field electrodes has been based on Teflon® sheathing heated and shrunk onto a metal tube and generator designs have mostly focused on successful techniques for sealing the ends of the Teflon®-covered metallic tube to ensure long-term protection from leaks that would cause short-circuiting of the electrical connections.

Since in operation each electrostatic-field generator system also comprises a negative electrode in contact with the liquid body, whether or not also insulated by a dielectric layer such as anodized aluminum, the electrostatic system consists of multiple capacitive layers in series (for example, Teflon®, water, and anodized aluminum) over which the applied electrostatic potential and field intensity are distributed. Focusing on the first capacitive body of the series provided by the dielectric material in the generator, it consists substantially of a parallel-plate capacitor. Therefore, given a certain static potential applied to the system, the field intensity across the first dielectric material is inversely proportional to its dielectric coefficient, as taught by basic physics. Thus, a higher dielectric coefficient results in a lower field intensity across it and a corresponding shift: of the available electric field to the body of water.

At the same time, I found that higher dissolved-solid concentrations in water also result in a higher effective dielectric coefficient for the body of water (tap water typically has a dielectric coefficient of approximately 80). For a given applied voltage, this results in a lower field intensity through the water which, in turn, may result in the field's effect on the dispersed particles being insignificant. This shift in the dielectric coefficient of the water body as a function of total dissolved solids, which is not recognized in the prior-art literature related to water treatment, is the significant point that contributes to poor performance of known devices in water with high concentrations of dissolved solids and is the fundamental justification for higher voltage applications.

Thus, thicker layers of dielectric materials having a higher dielectric coefficient are used to provide structural strength to the device of the invention, such materials also having a dielectric strength sufficient to maintain total insulation of the system as required to ensure an effective electrostatic field across the body of water. These criteria are met by the vitrified ceramics utilized for this invention, which provide high mechanical strength as well as the required dielectric-strength and dielectric-coefficient properties. Typically, the dielectric coefficient of vitrified high-alumina ceramics (porcelains) is in the 9.0 to 9.4 range, as compared to a value of 2.1 for Teflon®, similarly, these ceramics' dielectric strength is approximately 300–320 volts/mil, as compared to 200 volts/mil for Teflon®.

Referring to the drawings, wherein like parts are designated throughout with like numerals and symbols, FIG. 1 illustrates in elevational schematic view the various components of an electrostatic device 10 according to the present invention. As also shown in more detail in FIGS. 2 and 3, the device 10 consists of a ceramic tube 12 preferably of unibody construction and having a distal integrally-sealed end 14 and a proximal open end 16. The interior surface 18 of the tube 12 is lined with a layer of conductive material 20, such as aluminum or copper foil, disposed in intimate contact with the surface 18 in order to minimize the presence of gaps or air spaces therebetween. Depending on the material and process used to coat the interior of the ceramic tube, the inside of the sealed end 14 may or may not also be lined (it is shown as not lined in the figures), the capacitive effect of the tube being related to the overall surface of the conductive material 20, as one skilled in the art would recognize.

The end 22 of an appropriately insulated high-voltage cable 24 contained in protective conduit 25 is electrically connected to the conductive material 20 inside the tube 12. A conductive bushing 26, attached to the end 22 of the cable and press-fitted or otherwise connected to the conductive material 20, may be used to provide electrical contact between the two, but any equivalent method or device, such as by welding, would be suitable to practice the invention. This electrical connection is shown near the open end 16 of the ceramic tube in the figures, but it could be effected at any place along the inner length of the tube with equivalent result inasmuch as the entire surface of the conductive material 20 is obviously energized by the connection. Most importantly, though, the open end 16 must be sealed by nonconductive, preferably resilient, adhesive material 28 (such as silicone, latex, or rubber) that is tightly packed or molded (potting) between the insulating sheath 30 of the cable and the interior wall of the open end 16. Preferably, an outermost annular portion 32 of the interior wall of the open end 16 is not covered with the conductive material 20, so as to provide a continuous dielectric barrier at that end formed by the nonconductive material 28 filling the space between the cable sheath 30 and the ceramic tube 12.

Finally, as shown particularly in FIG. 4, the open end 16 of the ceramic tube 12 is hermetically capped by a mounting fixture 34 adapted for tight water-proof fit with the end 16 on one side and with a cable connector 36 on the other side. The specific shape and characteristics of the fixture 34 and connector 36 are not important for the invention so long as they are adapted to protect the open end 16 of the ceramic tube from penetration of liquid from the outer body of water in which the device is immersed during use. Thus, the gap between the female surface 38 of the fixture 34 and the male surface 40 of the tube 12 fitted thereto, whether by screwable or other type of engagement, must be perfectly sealed for long-term operation of the device. The same is true for the gap between the female surface 42 of the fixture 34 and the male surface 44 of the connector 36. Silicone or other insoluble, preferably resilient, sealing material 37 may be used to ensure water-tight coupling while making the various connections.

Figure 7:
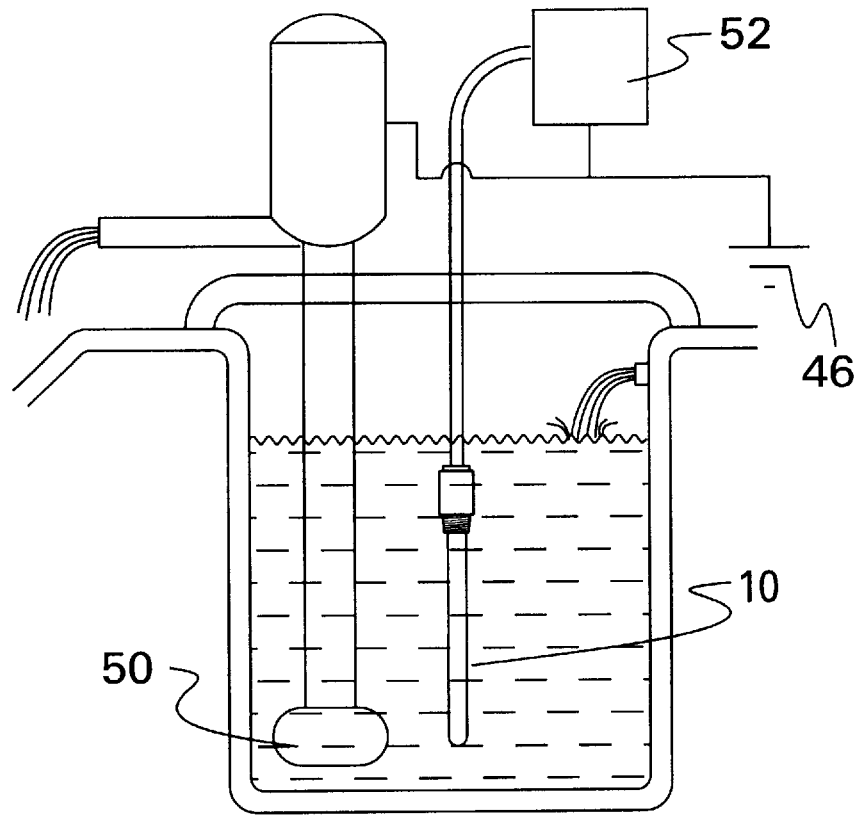
FIG. 7 is a schematic view of the device of the invention in use in a sump tank arrangement of a large scale water-treatment system.

As described, the outer ceramic tube 12 and the inner lining of conductive material 20 connected to a high-voltage positive power source provide a sound alternative to the electrostatic field generators of the prior art. As illustrated schematically in FIGS. 5–7, in operation the device 10 is immersed in a body of water which is connected to a ground 46 either directly or through an electrode immersed in the water at a distance from the device. Such grounded electrode may consist of piping 48, as seen in FIGS. 5 and 6, or a pump or other metallic equipment 50, as seen in FIG. 7. Depending on the water throughput and particulate content, the distance between the device 10 of the invention and the grounded electrode is adjusted to provide the electrical field required to cause the intended electrostatic effect on the particles dispersed in the water. The apparatus of the invention was tested and found to be very effective at a distance of approximately 2–3 inches, but theoretical calculations based on prior-art knowledge show that it could be operated successfully at distances in excess of 10 feet in waters with up to 3,000 ppm of total dissolved solids. When the conductive material 20 is energized from a power source 52 with a high positive voltage, the dielectric properties of the ceramic tube 12 insulate it from ground, creating an electrostatic field across the tube and the water body. As desired, because of the difference between the dielectric constant of the ceramic and that of the water, the majority of the electrostatic field affects the water body. The configuration of the device 10 allows operation at very high voltages (the apparatus has been tested at up to 50,000 volts and can be designed for much higher voltages, if necessary), which in turn makes it possible to effectively utilize it in large-scale applications.

Figure 8:
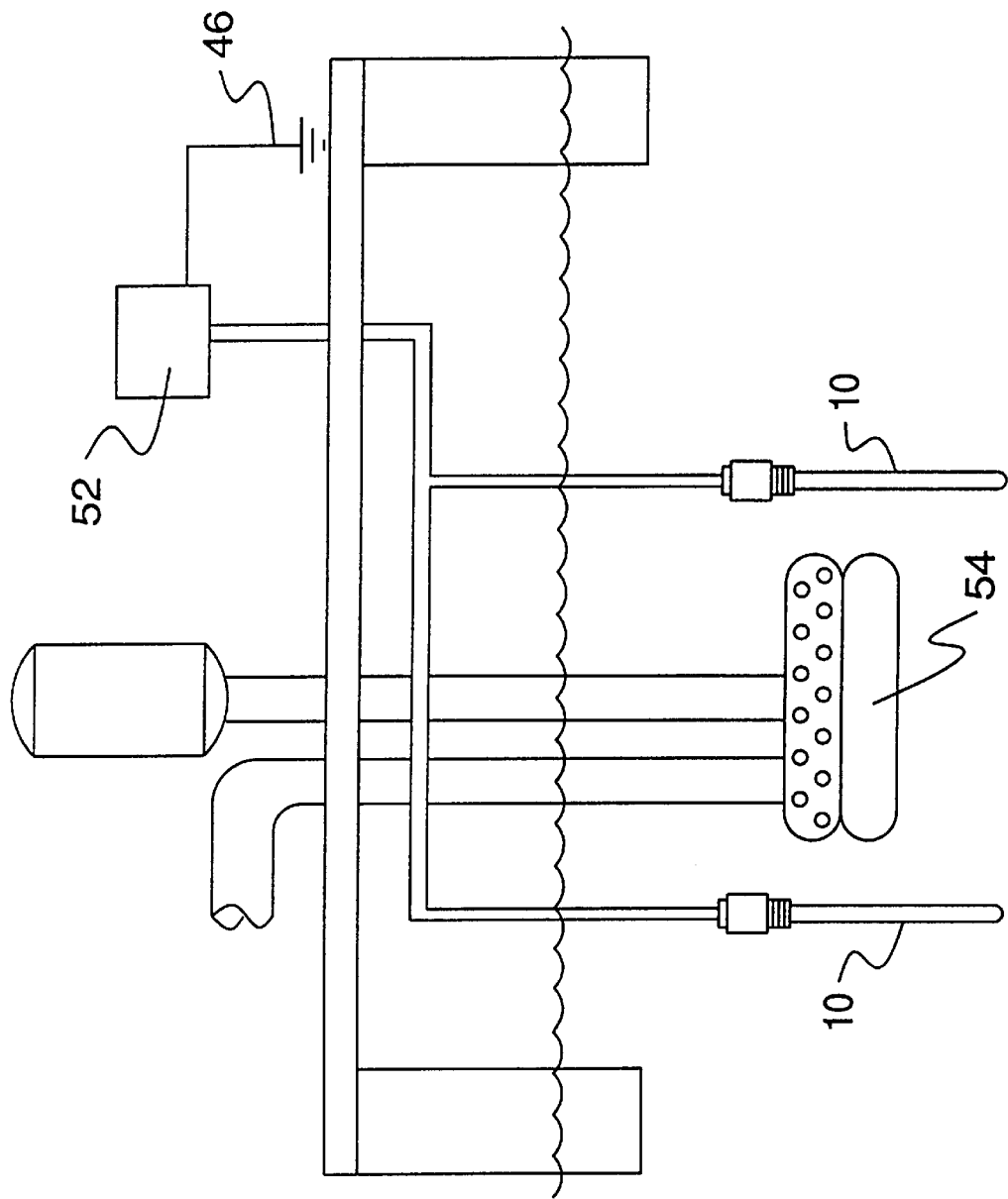
FIG. 8 is a schematic view of the device of the invention in use in a multi-unit floating arrangement of a large scale water-treatment system.

FIG. 8 illustrates an open-field application where multiple devices 10 are used in a floating arrangement in a pond in conjunction with a grounded submerged pump 54. Multiple electrostatic generators 10 are disposed in star arrangement so as to cover the entire space surrounding the inlet of the pump 54 to ensure adequate exposure (sufficient residence time) of all liquid being pumped through the electrostatic field produced by the system at a field intensity greater than the critical level required to improve particle dispersion. Depending on the quality of the water being treated and the operating voltage of the electrostatic system, the distance between each electrostatic generator 10 and the grounded electrode (such as the pump 54) is chosen so as to optimize efficiency and throughput. In a system operating at about 30,000 volts in a water stream providing a residence time of at least 5 seconds, a distance of between 1 and 10 feet was found to produce great scale- and sludge-formation improvements over any apparatus of the prior art, as detailed in U.S. Pat. No. 5,501,317, hereby incorporated by reference.

Another important inventive part of the device of the invention is the idea of assembling the conductor/dielectric layer combination in such a way that the weaker link is not in contact with the water being treated. In the devices of the prior art, a structurally weaker Teflon® layer separates the water from a stronger metallic tube. In case of any failure of the dielectric layer, the high-voltage tube becomes immediately shorted and the system breaks down. In particular, this may be caused even by pin-sized gaps between the surfaces of the tube and the Teflon® heat-shrunk around it. When subjected to an electrostatic field, arcing occurs across these gaps causing hot spots that eventually perforate the thin dielectric layer and completely disable the system. Since the severity of arcing is a function of the potential applied to the system, this problem severely limits the voltage at which the prior-art apparatus may be operated.

The device of the invention, on the other hand, provides a weaker metallic lining inside a stronger ceramic tube. If the lining is damaged, such as by arcing resulting from air gaps, discontinuities are created in the conductive material, rather than in the dielectric layer, and the high-voltage portion of the device remains insulated from the surrounding water. Therefore, other than by having a negligible effect on the capacitance of the system, these kinds of problems do not affect the continued viability and operation of the electrostatic device. Accordingly, very high voltages do not constitute a potential source of total breakdown, as in the case of prior-art apparatus.

The use of vitrified high-alumina ceramics (typically greater than 99.5 percent $Al_2O_3$), or any of a number of other formulations such as a vitrified mullite (also a porcelain) containing less alumina and more silica, is recommended for the application of this invention. Note that ceramics having as low as 50 percent alumina can be used to practice the invention, but their mechanical as well as electrical properties are much less desirable for high-voltage applications.

These ceramics have great physical strength, high abrasion and corrosion resistance, and may be assembled at relatively low cost, which all contribute to their diversity and flexibility of application. Thus, a strong and efficient electrode for this invention can be built by using a ceramic tube that has been cast and fired with one end closed. The high-alumina class of ceramics used is impervious to fluids and possesses the required structural strength for use as a bearing member. The conductor, as opposed to prior-art systems, is not a bearing structure but serves only to distribute the unipolar charge; accordingly, it may consist simply of a thin layer of material bonded to the inner surface of the tube. Because there is no structural role for the conductor, materials may be chosen to suit the operating environment or to obtain low cost or ease of construction. The conductor may be a thin layer of metal foil, such as copper or aluminum, bonded to the inner wall of the tube with a conductive adhesive; or it may be a conductive adhesive alone, such as an epoxy or acrylic, containing silver or nickel. Alternatively, the conductive layer may be pressed onto the inner surface of the ceramic tube, or sprayed by plasma metallization, or it may be applied as a conductive ceramic glaze (or even electroplated over such a glaze coating). Since there is no requirement for transmission of high levels of current, the conductor can be a very thin or even a relatively inefficient conductor. A conductive liquid, such as a concentrated solution L of copper sulphate completely filling the cavity within the ceramic tube, would also provide a suitable conductor (illustrated in the embodiment 60 of FIG. 9). The principal requirement is that the contact between the conductive layer and the dielectric material be as perfect and gap-free as possible to avoid void spaces with a low dielectric coefficient that would reduce the overall efficiency of the capacitor system.

In addition to the process for controlling scale and sludge deposits disclosed in my copending application, I have discovered a method whereby the efficiency of aggregate formation from suspended particles and colloids in a flocculation, coagulation or other inter-particle bonding process may be materially improved over a broad range of operating conditions and particle compositions. In view of the success obtained in altering the surface charge characteristics of suspended particles to improve their suspendibility, the method is based on the concept of also altering the charge density on the surface of the target particles for the purpose of advancing aggregation, rather than simply trying to tailor the use of chemical additives to produce that objective.

Figure 10:
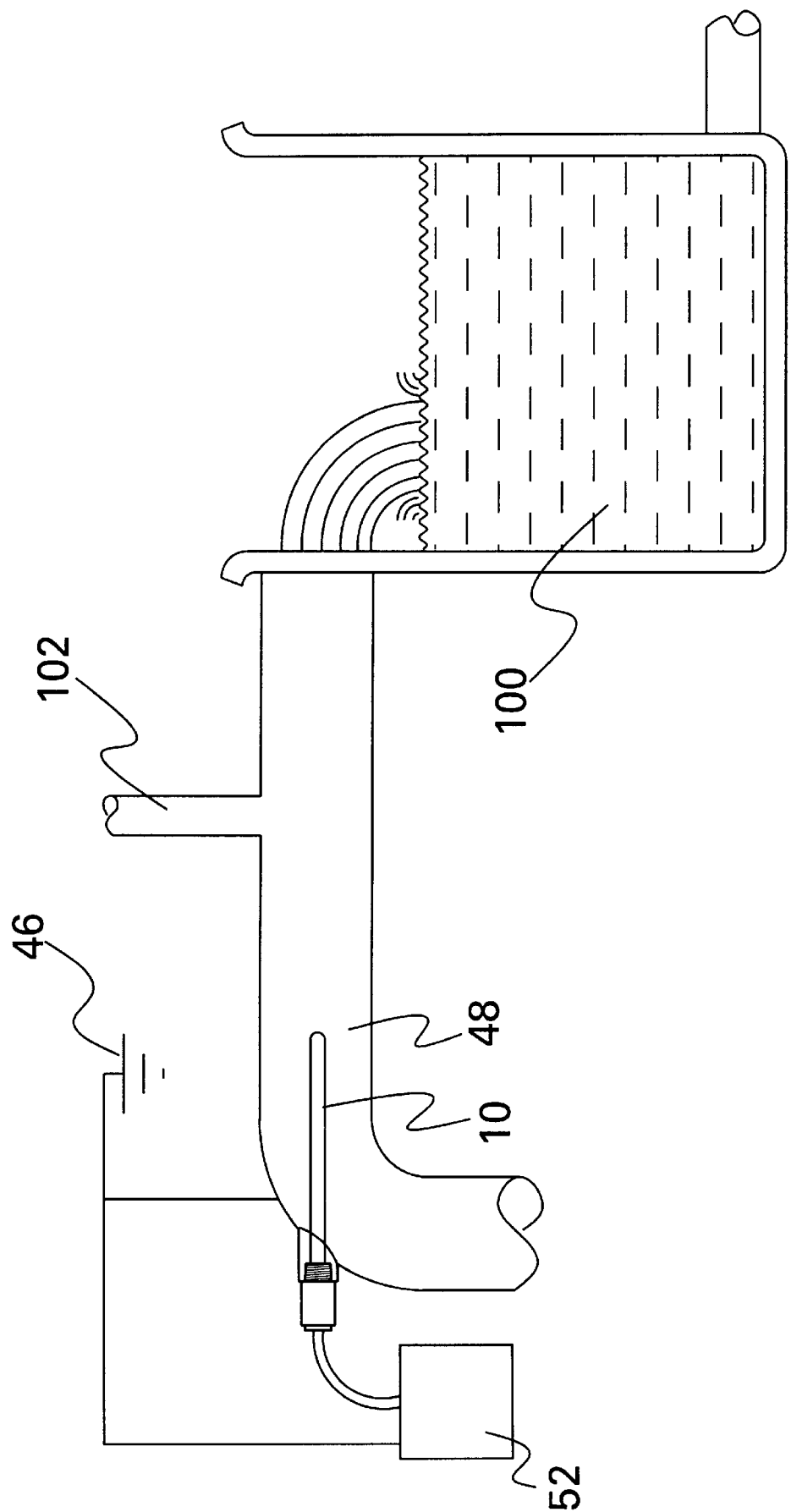
FIG. 10 is a schematic view of the device of the invention in use in a pipe feeding a solid-liquid separation unit.

The method involves the alteration of the natural charge of the particles in dispersion in the water being treated or comprising the solids mass of the suspension of solids being filtered or centrifuged. As illustrated in the schematic drawing of FIG. 10, at least one electrode 10 of the type described above, comprising an inner conductor and a dielectric outer surface, is placed so that the fluid suspension being processed passes through a zone of high charge density formed between the electrode and ground, which is normally provided by the pipe 48, vessel, or other facility for holding the suspension, such as a concrete tank, trough or ditch. As in the scale-prevention application described above, this arrangement of the electrode 10 and the grounded surface of the pipe 48 exhibits the electrical structure of a capacitor which may be charged by a high voltage power supply 52 of positive or negative sign depending on the nature of the application, thereby altering the charge on the surface of particles and colloids in suspension in the water flowing toward the separation unit 100. Aggregation chemicals, such as flocculation or coagulation promoters, are added to the suspension through a feed pipe 102 according to conventional procedures.

The surface charge of particles and colloids in suspension is indicative of the relative repulsion forces between them. Inter-particle repulsion counters the van der Waals attraction forces among particles and between particles and the surface of the pipes containing the suspension. Van der Waals attraction is generally considered to be a function of the material's composition and the resultant molecular dipole. A balance between the two forces, van der Waals and particle-charge repulsion, results in a stable dispersion.

When suspended particles are sufficiently low in surface charge, they are pulled together by van der Waals attraction to form larger agglomerates that facilitate sedimentation and separation. This process, which is normally referred to as flocculation, may thus be enhanced by the addition of electrolytes that reduce the surface charge of the particles. Obviously, the required specific properties of these electrolytes depend on the nature of the suspended particles, the objective always being the reduction of surface charge to promote van der Waals attraction and flocculation.

The natural surface charge and potential of inorganic particles is usually determined by crystal structure and by the location and intensity of the charge sites on the crystal edges. The electrical potential of organic materials is also determined by composition and, in addition, by the degree of hydrolysis to which the organic substance has been subjected. Thus, for example, hydrolyzed organic matter often exhibits a net positive charge; living bacteria a low negative charge; and clay minerals a net negative charge. Accordingly, water treatment units in mining operations typically utilize positive electrolytes, such as iron or aluminum ions, to produce clay aggregates in order to clarify process waters.

The electrical behavior of suspended particles is explained in the art in terms of a two-layer model for the charge distribution of electrolytes around each particle. See Shamlou, P. A., ed., *Processing of Solid-Liquid Suspensions*, Oxford, Butterworth-Heineman Ltd. (1993), pp.18–58. An inner, dense layer at the surface of the particle, consisting of ions in solution attracted by the particle's charge, exhibits a charge of polarity opposite to the natural charge of the particle itself under the physical and chemical conditions of the suspension. An outer layer of yet opposite polarity, also consisting of ions in solution, is diffused within a given distance from the particle's surface.

The net potential between the two layers (normally referred to in the art as the zeta potential) produces a repulsion that counteracts the van der Waals attraction between particles. If the outer layer is diffused over a sufficiently wide radius, the particles are kept apart and will remain in stable suspension. If, on the other hand, the radius of diffusion of the outer layer is reduced to the point where van der Waals forces prevail, the particles are attracted to form agglomerates that tend to separate from the liquid phase.

The electrostatic generator of the invention functions by inducing an alteration of the natural surface charge density of the suspended particles irrespective of composition. The conductive material 20 of the electrostatic generator 10 of the invention and the grounded pipe wall 48 form a capacitor inducing an electric field across the water flowing by that is a function of charge voltage, system dimensions, and dielectric properties of the ceramic tube 12 and the water suspension. At sufficiently high voltages, the field strength across the water influences the capacitive charge of the particles, resulting in a corresponding sharp increase in the surface charge of all wetted surfaces.

The surface charge of the suspended particles, having been altered in the strong electrostatic field generated by the device 10, modifies the ionic composition and thickness of the double layer surrounding each particle. The electrochemical reactions within the capacitor field thus cause the distribution of surface charge on particles throughout the fluid to become elevated and uniform in sign. Since the particles have higher surface energy levels, the interaction with surface active chemical additives is accelerated and becomes more efficient, especially in reaction with flocculating or coagulating agents, thereby causing particle agglomeration and adsorption of neutral colloids in suspension.

The device of the invention was tested in separation processes at a solvent extraction plant in a mining operation and a sludge centrifuge in a sewage plant. The performance of the device was tested by comparing the turbidity of the throughput after treatment and the levels of chemical consumption.

EXAMPLE 1

The device of the invention was tested in a solvent extraction plant at the Cyprus Mine in Twin Buttes, Ariz. The device was immersed adjacent to a pump feeding a flocculation tank at a rate of about 5,000 gpm, placed at a distance of approximately 4 feet from the suction of the pump (the grounding connection) and 200 feet ahead of the flocculation tank. The water slurry contained 20–25 ppm solids. The device was energized at about 10,000 volts dc and operated continuously for 1,000 hours without failure. Given the flow rate of the water slurry, an average residence time of about 10 seconds in the electrostatic field was obtained. During the test, the introduction of chemical flocculent to the process along with the charged colloidal particles produced a reduction of at least 25% in the turbidity of the water exiting the settling tank as compared to the condition when the combination of chemical and electrode was not used.

EXAMPLE 2

The device of the invention was tested in a sludge separation plant at the Toronto Metropolitan Sewage Plant in Ontario, Canada. The device was immersed in a pipe feeding sewage sludge to a solid-bowl centrifuge at the rate of about 200 gallons per minute. The water slurry contained 6–10 wt percent solids. Prior to entry into the centrifuge, a flocculent was added to improve the dewatering performance of the centrifuge. The device was placed approximately 30 feet upstream of the point of addition of the flocculent, affording 3 to 6 seconds of transit time of the slurry solids through the electrostatic field. The device was energized at 30,000 volts dc for 100 hours without interruption. During the test the quantity of flocculent was reduced not less than 10% without loss of dewatering efficiency in the centrifuge.

These examples show l:hat the use of this technique allows sharp reductions in the quantity of chemical additives employed with corresponding savings in chemical costs. The use of electrostatic generators in conjunction with chemicals produces a more efficient removal of solids from waters, especially the collection of smaller particles and those that are weak in natural charge density. As a result of the enhanced reactivity of chemical additives, the method of the invention makes it possible to use very low cost chemical additives that were previously considered unsuitable because of poor surface reactivity with the particles of concern. Because of the higher overall efficiency of the resulting aggregation process, the method is also expected to yield increases in the rate of process throughput.

The effectiveness of electrostatic generators in aggregation processes may be modified as needed to meet different operating conditions or choice of equipment by using either positive or negative power supplies, by alternating the sign at various frequencies or by varying the voltage level at which the electrode is charged.

Thus, various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent apparatus and methods.

I claim:

1. A method for enhancing the efficiency of a solid-liquid separation process by exposure to an electrostatic-field generator, said process involving the addition of chemical additives to a slurry of fine particles suspended in water to promote their aggregation into coarser particles, the method comprising the following steps:

(a) providing an electrostatic generator adapted to create an electrostatic field;

(b) immersing said electrostatic generator in a body of flowing water containing suspended particles feeding a solid-liquid separation unit, said water being connected to an electrical ground;

(c) energizing said electrostatic generator with a static electromotive force, such that an electrostatic field is created between said generator immersed in the water and said electrical ground; and (d) adding chemical additives to the water to produce aggregation of the suspended particles in said separation unit;

wherein said electrostatic generator comprises a vitrified ceramic tube of unibody construction having an integrally-sealed end defining an inner cavity with an inner wall; conductive material contained within said inner cavity and disposed in intimate contact with said inner wall; electrically-insulated sealing means for providing hermetic closure to said inner cavity; and electrical means for energizing said conductive material with a static electromotive force.

2. The method of claim 1, wherein said electrically-insulated sealing means consists of nonconductive adhesive material.

3. The method of claim 1, wherein said step of energizing said electrostatic generator with a static electromotive force consists of connecting an insulated cable thereto and energizing the cable by a power supply in closed circuit with said electrical ground.

4. The method of claim 1, wherein said step (c) is carried out by energizing said conductive material with a static electromotive force at a voltage not less than 10,000 volts.

5. The method of claim 1, wherein said vitrified ceramic tube has a circular cross-section.

6. The method of claim 1, wherein said ceramic tube has an integral sealed end.

7. The method of claim 1, wherein said conductive material consists of a metallic foil bonded to said inner wall by means of conductive adhesive.

8. The method of claim 1, wherein said electrically-insulated sealing means consists of nonconductive adhesive material sealing said inner cavity.

9. The method of claim 8, wherein said nonconductive adhesive material consists of silicone.

10. The method of claim 1, wherein said electrical means for energizing said conductive material consists of an insulated cable electrically connected thereto and to a power supply in closed circuit with electrical ground.

11. The method of claim 1, wherein said vitrified ceramic tube is manufactured with a vitrified ceramic having at least 50 percent alumina and having a dielectric coefficient greater than approximately 9.0.

12. The method of claim 1, wherein said vitrified ceramic tube is manufactured with a mullite.

13. The method of claim 1, wherein said vitrified ceramic has a dielectric strength approximately 300–320 volts/mil.

14. Apparatus for enhancing the efficiency of a chemical aggregation process for solid-liquid separation by exposure to an electrostatic field, comprising:

(a) a solid-liquid separation unit;

(b) an electrostatic generator adapted to create an electrostatic field upstream of the separation unit in a body of flowing water containing suspended particles feeding said solid-liquid separation unit; and (c) means for feeding chemical additives to the body of flowing water downstream of the electrostatic generator to produce aggregation of the suspended particles in the solid-liquid separation unit;

wherein said electrostatic generator comprises a vitrified ceramic tube of unibody construction having an integrally-sealed end defining an inner cavity with an inner wall; conductive material contained within said inner cavity and disposed in intimate contact with said inner wall; electrically-insulated sealing means for providing hermetic closure to said inner cavity; and electrical means for energizing said conductive material with a static electromotive force, said electrical means being adapted to create an electrostatic field between said generator and an electrical ground.

15. The apparatus of claim 14, wherein said electrical means for energizing said conductive material consists of an insulated cable electrically connected thereto and to a power supply in closed circuit with said electrical ground.

16. The apparatus of claim 14, wherein said vitrified ceramic tube is manufactured with a vitrified ceramic having at least 50 percent alumina and having a dielectric coefficient greater than approximately 9.0.

17. The apparatus of claim 14, wherein said vitrified ceramic has a dielectric coefficient approximately in the 9.0 to 9.4 range and a dielectric strength approximately 300–320 volts/mil.

* * * * *